Sept. 26, 1961 D. C. HEITSHU 3,001,633
SCREW CONVEYOR ASSEMBLY
Filed March 22, 1960 2 Sheets-Sheet 1
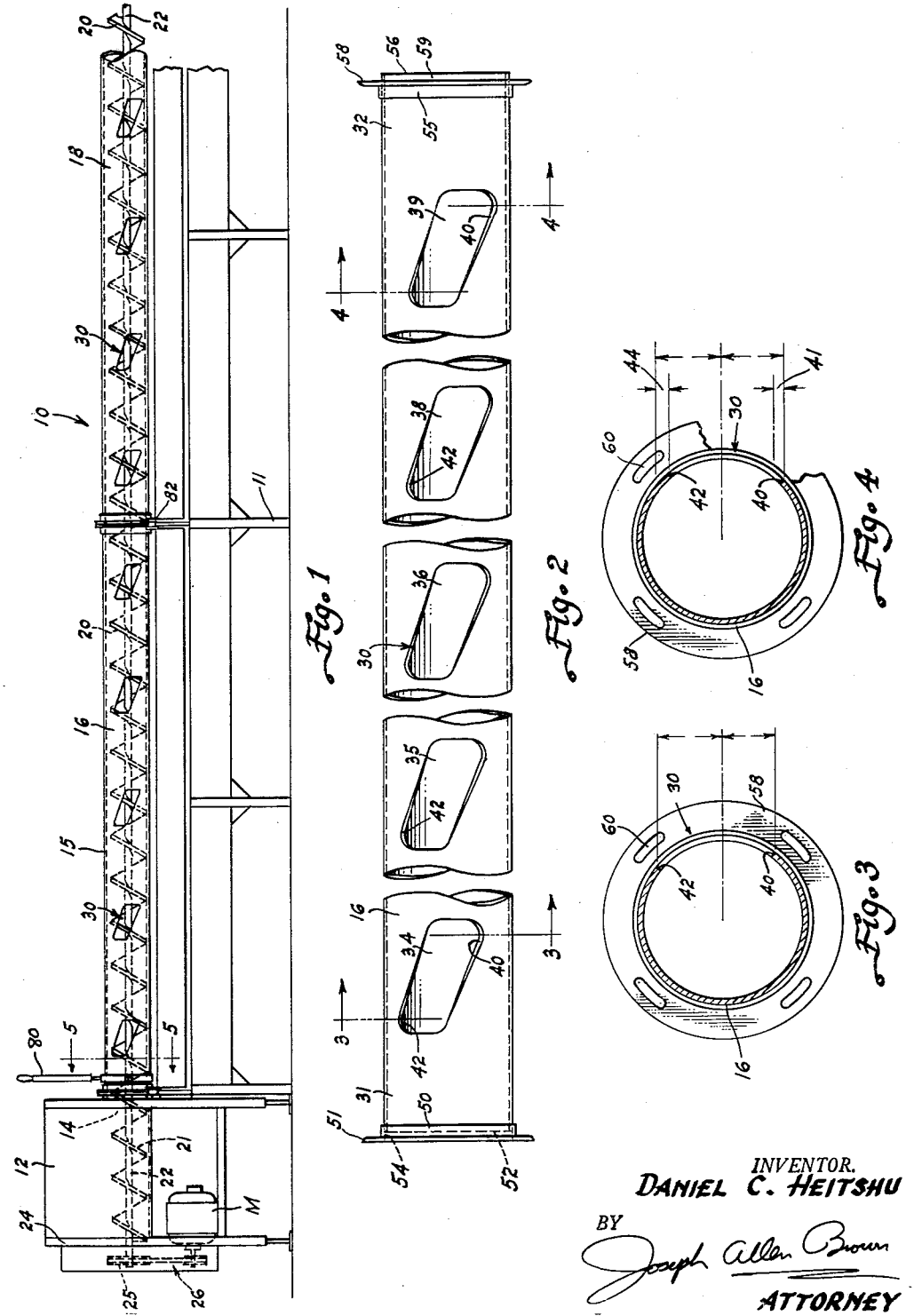
INVENTOR.
DANIEL C. HEITSHU
BY
Joseph Allen Brown
ATTORNEY Sept. 26, 1961  D. C. HEITSHU  3,001,633
SCREW CONVEYOR ASSEMBLY
Filed March 22, 1960  2 Sheets-Sheet 2
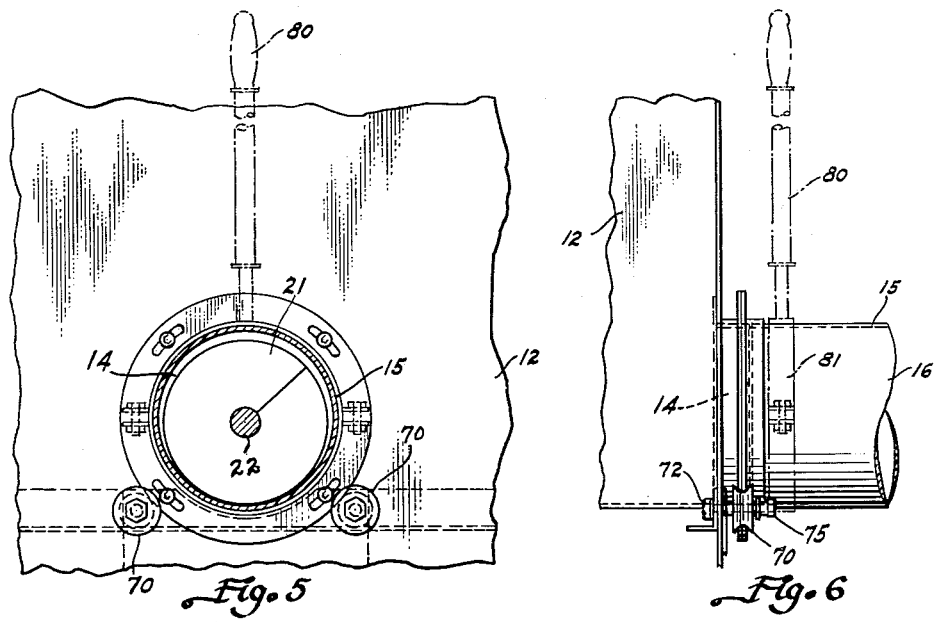
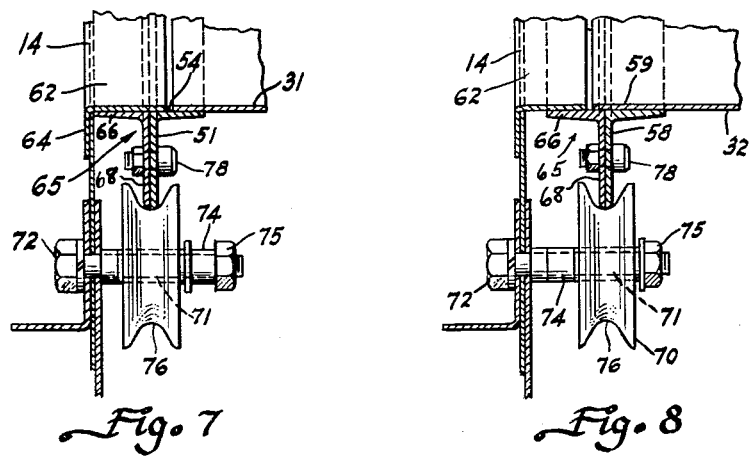
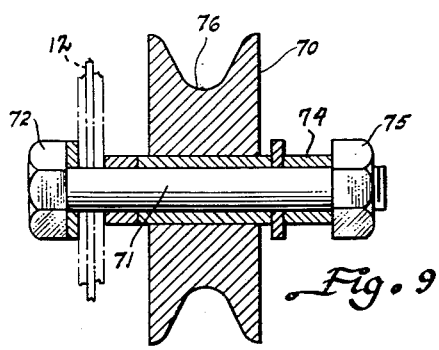
INVENTOR.
DANIEL C. HEITSHU
BY
Joseph Allen Brown
ATTORNEY

United States Patent Office 3,001,633
Patented Sept. 26, 1961

3,001,633
SCREW CONVEYOR ASSEMBLY
Daniel C. Heitshu, Shippensburg, Pa., assignor to Sperry Rand Corporation, New Holland, Pa., a corporation of Delaware
Filed Mar. 22, 1960, Ser. No. 16,744
8 Claims. (Cl. 198—64)

The present invention relates generally to apparatus for conveying forage or the like. More particularly, the invention relates to an improvement in conveyors of the type shown and described in U.S. Patent No. 2,867,314, issued January 6, 1959.

The structure shown in such patent comprises a hopper adapted to receive forage, shelled corn, food supplements or the like. The hopper has a bottom, lateral outlet opening. Communicating with the opening is a conveyor comprising a tube in which an auger is rotatable. The auger withdraws material from the hopper and conveys it through the tube and away from the hopper. The tube has a plurality of longitudinally spaced holes. Each hole has a lower wall and these walls are disposed progressively lower from a high point adjacent the hopper to a low point at the remote end of the tube. The progressively lower positioning of each hole enables the distribution of material evenly along the length of the conveyor. The amount of material discharged from one hole will be substantially the same as the amount of material discharged from any other hole.

The apparatus shown in Patent No. 2,867,314 is particularly adapted to be used in feeding animals. The overall length of the conveying structure is determined by the needs of the user. Frequently, the feeder is sold in fifty, one hundred, or one hundred and fifty foot lengths. However, other lengths may be provided as desired or required. For optimum and uniform discharge material along the conveyor, it is necessary that the progressively lower positioning of each hole from a prior hole be established according to the overall length of the conveyor tube. For example, if the overall length of the conveyor is to be fifty feet, it is desirable to have holes which are displaced about $\frac{1}{8}''$ from each other. In an installation one hundred feet long, it is desirable to have holes which are displaced about $\frac{1}{16}''$ relative to each other. For an installation one hundred and fifty feet long a lesser hole displacement is required, such as $\frac{1}{32}''$. Thus, the longer the tube, the less the hole displacement.

Heretofore, conveyors of this type have been manufactured wherein three tube sizes are provided. All of the tubes have the same diameter. However, the angular displacement of the holes in any given size of tube will differ from the angular displacement of the holes in another size tube. Specifically, it has been the practice to manufacture tubes having $\frac{1}{8}''$, $\frac{1}{16}''$ and $\frac{1}{32}''$ hole displacement. Manufacturing three different tube sizes requires three separate manufacturing arrangements. Further, the dealer who handles the conveying equipment must stock three tube sizes. Therefore, manufacturing and sales problems are three times greater than if a single tube size was employed.

Likewise, the farmer who uses the conveyor has problems. If he installs a fifty foot conveyor system having tubes with a $\frac{1}{8}''$ hole spacing and later wishes to increase his installation to one hundred and fifty feet, it is necessary that he replace the tubes which he has in use with tubes which have a $\frac{1}{32}''$ hole spacing if optimum operating characteristics are to be obtained. In like respect if a farmer has a hundred and fifty foot installation and wishes to remove one hundred feet, it is necessary that he change the tube size on the fifty foot section retained from a $\frac{1}{32}''$ hole spacing to a $\frac{1}{8}''$ hole spacing. Therefore, the ultimate user of the equipment is likewise subjected to problems.

It has been proposed to solve the three size tube problem by providing a single size tube made up of tube sections each of which has a series of "stepped" openings. Each opening has a lower wall portion which is usable when the tube is mounted rightside up and produces a given discharge rate. Each opening also has a higher wall portion which is usable when the tube is mounted upside down and turned end for end. The higher wall portions when in a down turned position produce a different discharge rate than the lower wall portions. Such structure causes problems in connecting the first tube section of the tubular conveyor to the hopper. This results because the sections which make up the tube have ends which are not the same. Specifically, it is desirable to have tube sections which interfit one with another to provide an overall tube which has a minimum interruption where the respective tube sections join each other. Each tube section has a female end having a socket and an opposite male end having a projecting tube portion. When the tube sections are assembled, the male end of one section fits into the female end of the next tube section. However, the first tube section which is connected to the hopper has the female end facing the hopper when the tube is rightside up and has the male end facing the hopper when the tube is upside down.

One object of this invention is to provide a simple means whereby either the male or the female end of a tube section of a conveyor of the character described can be connected to the outlet opening of a feed hopper.

Another object of this invention is to provide means whereby either the male or female end of a conveyor tube section can be connected to the outlet opening of a feed hopper for a rotatable adjustment relative thereto.

Another object of this invention is to provide means whereby when a tube section is connected to the feed hopper it is locked against axial movement relative to the hopper.

A further object of this invention is to provide connecting means which is of simple design whereby either the male or female end of a tube section can be quickly and easily connected to a feed hopper.

A still further object of this invention is to provide a connecting structure which is of low cost both in manufacture and assembly.

Other objects of this invention will be apparent hereinafter from the specification and from the recital in the appended claims.

In the drawings:

FIG. 1 is a fragmentary side elevation of a conveyor having a hopper and a delivery tube, and provided with means for connecting the first tube section to the hopper constructed according to this invention;

FIG. 2 is an enlarged side elevation of the first tube section of the conveyor and showing, in particular, the male and female ends of the tube;

FIGS. 3 and 4 are sections taken on the lines 3—3 and 4—4 of FIG. 2, respectively, looking in the direction of the arrows;

FIG. 5 is an enlarged section taken on the line 5—5 of FIG. 1 looking in the direction of the arrows;

FIG. 6 is a side elevation of FIG. 5;

FIG. 7 is an enlarged part section, part side elevation of the means connecting the female end of the tube section to the hopper, the mounting roller being shown in an inwardly adjusted position;

FIG. 8 is a view similar to FIG. 7 but showing the male section connected to the hopper and the mounting roller adjusted to an outer position; and FIG. 9 is a section through the support for the mounting roller shown in FIGS. 7 and 8.

Referring now to the drawings by numerals of reference, and first to FIG. 1, 10 denotes generally conveying apparatus which comprises a support frame 11 having a hopper or supply source 12 mounted on one end thereof. The hopper has a bottom, lateral discharge opening 14 which communicates with a tube 15. Tube 15 comprises a plurality of tube sections each of which may be of any suitable length, such as ten feet long. In FIG. 1, two full tube sections are shown, namely sections 16 and 18. Extending through the tube sections is an auger 20 having one end 21 disposed within the bottom of the hopper 12. Auger 20 has a shaft 22 which extends through the side wall 24 of the hopper 12 and has a drive pulley 25 mounted thereon. Power to rotate the auger is from an electric motor M mounted on the frame 11 and connected to the drive pulley 25 through the power train indicated at 26. When viewed as shown in FIG. 1, auger 20 rotates in such direction that the material in the hopper 12 is conveyed from left to right through the tube 15 and sections 16 and 18.

In order to secure the even discharge of material along the length of the conveyor tube, the structure is provided with lateral discharge openings 30 which are longitudinally spaced relative to each other. The successive openings in the tube are all of identical configuration. However, they are angularly displaced relative to each other as described in Patent No. 2,867,314 to produce a uniform discharge along the length of tube 15. Each tube section is of identical construction. Therefore, only the structure of the tube section 16 will be described here; it being understood that tube section 18 and the other tube sections are similarly fabricated.

Tube section 16 has a female end 31 and a male end 32. The openings 30 are positioned between these ends, there being five openings shown. A greater or lesser number of openings could be provided as desired. The openings are denoted 34, 35, 36, 38 and 39 from the end 31 to the end 32. Each of these openings has a lower wall portion 40, there being an angular displacement of each successive lower wall portion from the end 31 to the end 32 of the tube section. The opening 35 has a lower wall portion 40 slightly below the wall portion 40 of the opening 34. The same lower wall displacement is carried out throughout the length of the tube section. Preferably, the angular displacement of the lower wall portions of the holes is about $\frac{1}{64}''$. Therefore, the wall portion 40 of the opening 39 is $\frac{1}{16}''$ below the wall portion 40 of the opening 34, as indicated, in exaggerated form, by the arrows 41 in FIG. 4.

In addition to the lower wall portion 40 of each hole, each hole has a higher wall portion 42. Each higher wall portion 42 of the successive holes is progressively angularly displaced relative to the previous hole or holes. The wall portion 42 of the hole 35 is below the wall portion 42 of the hole 34. The angular displacement of the higher wall portion of one hole relative to a previous hole is indicated by the arrows 44 in FIG. 4. The progressive angular displacement of the higher wall portions 42 from the female end 31 to the male end 32 of the tube section 16 is different from the displacement provided for the lower wall portions 40. Specifically, each successive hole has a higher wall portion 45 which is displaced about $\frac{3}{64}''$ from its associated holes.

Thus, the wall portions 40 of each hole provide a step rate of $\frac{1}{64}''$, while the wall portions 42 of each hole are disposed at a step rate of $\frac{3}{64}''$ relative to each other.

Mounted on the female end 31 of the tube section 16 is a collar 50 having a radial flange 51. The flange 51 is axially spaced from the end 52 of the tube 16 whereby a socket 54 is formed, FIGS. 2 and 7. The male end 32 of the tube has a similar collar 55. However this collar is displaced inwardly from the end 56 of the tube section. The collar 55 has a radial flange 58. Therefore, the male end of the tube section 16 has an axially projecting portion 59.

When the conveyor is mounted with each tube section positioned as shown in FIG. 2, with the female end 31 toward the hopper 12 and the male end 32 remote therefrom, material conveyed through the tube is discharged laterally over the lower wall portions 40 of the tube openings 30. Since the progressive increment of drop of the successive holes is $\frac{1}{64}''$, an installation in the range of about one hundred to one hundred and fifty feet is permissible, and a desired accurate discharge rate will be obtained. However, if the structure is assembled with the tube sections turned upside down and the male ends 32 positioned toward the hopper 12, then each tube section will have the upper wall portions 42 located downwardly. When so arranged, material conveyed through the tube and discharged laterally out of the openings 30 will pass over the wall portions 42 instead of the wall portions 40. The angular displacement of the wall portions 42 of the successive holes is $\frac{3}{64}''$ from hole to hole which makes the tube suitable for an installation in the range of fifty to one hundred feet long. Therefore, the discharge rate will be different from that achieved when the tube is rightside up. Such design enables one tube section to have different discharge characteristics depending on whether it is mounted rightside up or upside down. It has been found that providing two step rates, namely $\frac{1}{64}''$ and $\frac{3}{64}''$, is fully adequate to take care of practically all installations.

The flanges 51 and 58 are similarly constructed and clearly shown in FIGS. 3 and 4. Each flange has four arcuate slots 60 located 90° apart and providing means whereby bolts or the like can be passed through the slots to connect tube sections together. When the conveyor tube 15 is assembled, a female end is mounted on the male end wherein the projecting portion 59 of a male end 32 fits into the socket 54 in the female end 31. This gives a stability to the tube structure and provides a substantially uninterrupted conduit.

There is no problem in connecting the various tube sections to each other whether the tube is mounted rightside up or upside down. However, when positioned rightside up, it is necessary to connect a female end to the hopper 12 and when the tube is mounted upside down then it is necessary to connect a male end to the hopper 12. For readily connecting the tube to the hopper 12, regardless of whether a male or female tube end is presented, the structure of this invention has been provided and will now be described.

The outlet opening 14 in the hopper 12 is surrounded by a sleeve 62 having a portion 64 affixed to the hopper. The sleeve 62 projects outwardly of the hopper and it has a diameter substantially the same as the diameter of the tube 15. Mountable on the sleeve 62 is an adapter member 65 having an axial collar 66 and radial flange 68. The inside diameter of collar 66 is such that the adapter member will readily slide onto the sleeve 62. The radial projection of the flange 68 is substantially the same as the radial projection of the flanges 51 and 58 on the tube 15. The flange 68 has arcuate slots, not shown, which are the same as the slots 60 in the flanges 51 and 58.

When adapter member 65 is mounted on the sleeve 62, it is supported by means comprising a pair of rollers 70 positioned as shown in FIG. 5 on opposite sides respectively of a vertical plane through the center of the tube 15. The rollers 70 are identical and are mounted on the hopper as shown in FIGS. 7 and 8. Each roller is rotatably mounted on the shaft 71 of a bolt 72 fastened to the hopper 12. Also mounted on shaft 71 is a spacer bushing 74 adapted to be selectively interposed in front of or behind its associated roller. When positioned as shown in FIGS. 7 and 9, outside of the roller 70 and between the roller and a nut 75, the roller is positioned closely adjacent to the hopper 12. However, if the spacer bushing 74 is mounted inside its associated roller 70 as shown in FIG. 8, then the roller is spaced from the hopper 12, as shown. In either position, the pairs of rollers are adapted to support adapter member 65. Each roller has a peripheral groove 76 in which the adapter flange 68 extends, and also the end flange, 51 or 58 as the case may be. Thus, the adapter member is restrained from axial movement relative to the sleeve 62 and away from hopper 12.

When the tube structure is assembled and the female end 31 is connected to the hopper 12, the rollers 70 are mounted as shown in FIG. 7 which the spacer bushings 74 outside the rollers. The flange 68 on the adapter member is connected by bolt nut means 78 to the flange 51. Sleeve 62 projects into the socket 54. When so mounted, the conveyor tube is properly supported yet restrained from axial movement relative to the hopper 12.

When the tube is turned upside down and end for end, then a male end is connected to the hopper as shown in FIG. 8. The adapter member 65 is connected to the flange 58 by the bolt means 78. The rollers 70 are mounted in this outboard or second position with the spacer bushings 74 inside the rollers. When so mounted, the projecting portion 59 of the male end of the tube section extends into the collar 66 of the adapter member. The flange 68 of the adapter and flange 58 of the tube ride in the peripheral grooves 76 of the rollers. The rollers restrain the tube from axial movement away from the hopper, as well as support the tube.

With this structure, the female or male end of a tube section can be readily connected to the hopper 12. Merely by shifting the spacer bushing 74 from one side to the other of the rollers 70, the rollers can be properly positioned to support the tube end.

The structure just described for connecting either the male or female end of a tube section to the hopper 12 is relatively inexpensive and easy to assemble. Common parts are used regardless of which end of a tube section is connected to the hopper. Nevertheless, such tube sections will be locked to the hopper and prevented from axial movement relative thereto. However, the conveyor tube is free to be rotatably adjusted relative to the hopper regardless of which tube end is connected to the hopper. Such adjustment is achieved by means of a handle 80 connected to the conveyor tube by a strap 81 (FIG. 6) which encircles the tube. Preferably the tube is supported along its length on rollers 82 (FIG. 1) to facilitate rotatable adjustment of the tube.

While this invention has been described in connection with a particular embodiment thereof, it will be understood that it is capable of further modifications and this application is intended to cover any variations, uses or adaptations of the invention following, in general, the principles of the invention and including such departures from the present disclosure as come within known or customary practice in the art to which the invention pertains and as fall within the scope of the invention or the limits of the appended claims.

Having thus described my invention, what I claim is:

1. In a conveyor for forage or the like, a hopper having a discharge opening, a tube communicating with said opening to receive material therefrom, said tube having a flanged female end and a flanged male end, said female end having a socket and said male end an outwardly projecting portion, and means for selectively connecting either end of said tube to said hopper comprising a sleeve affixed to said hopper, said sleeve surrounding said opening and projecting outwardly therefrom, an adapter member, means connecting said adapter member to that flanged end of the tube connected to the hopper, said adapter member having a collar which projects axially beyond said tube and slidably fits onto said sleeve, means supporting said adapter on said hopper, and means for adjusting said supporting means toward and away from said hopper.

2. In a conveyor for forage or the like, a hopper having a discharge opening, a tube communicating with said opening to receive material therefrom, said tube having a flanged female end and a flanged male end, said female end having a socket and said male end an outwardly projecting portion, and means for selectively connecting either end of said tube to said hopper comprising a sleeve affixed to said hopper, said sleeve surrounding said opening and projecting outwardly therefrom, an adapter member, means connecting said adapter member to that flanged end of the tube connected to the hopper, said adapter member having a collar which projects axially beyond said tube and slidably fits onto said sleeve, means on said hopper for supporting said adapter, said supporting means being adjustable, selectively, to a first position adjacent said hopper and to a second position more remote therefrom, and means for locking said member in either adjusted position against outward movement relative to said hopper.

3. In a conveyor for forage or the like, a hopper having a lateral discharge opening, a tube communicating with said opening to receive material therefrom, said tube extending horizontally and having a radially flanged female end and a radially flanged male end, said female end having a socket and said male end an axially projecting portion, and means for connecting either end of said tube to said hopper comprising a sleeve affixed to said hopper, said sleeve surrounding said opening and projecting outwardly therefrom, an adapter having a radial flange and an axial collar, means connecting said adapter flange to the flange at that end of said tube connected to said hopper, said collar projecting axially from said tube and slidably fitting onto said sleeve, a pair of rollers cooperatively supporting said adapter, means selectively connecting each of said rollers to said hopper in a first position adjacent said hopper and a second position more remote therefrom, and means locking said pair of rollers in either position against outward movement relative to said hopper.

4. In a conveyor for forage or the like as recited in claim 3 wherein said pair of rollers are disposed in said first position when said female end is connected to said hopper and in said second position when said male end is connected thereto.

5. In a conveyor for forage or the like as recited in claim 3 wherein said sleeve projects into said socket when said female end is connected to said hopper.

6. In a conveyor for forage or the like as recited in claim 3 wherein each roller of said pair of rollers is peripherally grooved and the adapter flange seats therein whereby said tube is restrained against outward movement relative to said hopper.

7. In a conveyor for forage or the like as recited in claim 3 wherein each roller of said pair of rollers is rotatably mounted on the shaft of a bolt extending parallel to the tube axis, and there is a spacer member selectively mountable on said shaft inwardly of its associated roller relative to said hopper or outwardly thereof.

8. In a conveyor for forage or the like as recited in claim 3 wherein the flanges on said tube and the flange on said adapter have the same radial projection from the tube.

References Cited in the file of this patent
UNITED STATES PATENTS

| | | |
|---|---|---|
| 2,630,906 | Philipp | Mar. 10, 1953 |
| 2,867,314 | Hansen | Jan. 6, 1959 |

FOREIGN PATENTS

| | | |
|---|---|---|
| 13,488 | Austria | Sept. 25, 1903 |